United States Patent Office 2,830,985
Patented Apr. 15, 1958

2,830,985

CERTAIN ANHYDROFURANOSYL PURINES AND INTERMEDIATES

Bernard Randall Baker, Birmingham, Ala., and Robert Eugene Schaub, Paramus, N. J., assignors to American Cyanamid Company, New York, N. Y., a corporation of Maine No Drawing. Application March 11, 1955
Serial No. 493,832

6 Claims. (Cl. 260—211.5)

This invention relates to a new series of organic compounds. More particularly, this invention is concerned with certain anhydrofuranosyl purines, intermediates therefor and methods for their preparation.

In the copending application of Bernard R. Baker, Joseph P. Joseph and Robert E. Schaub, Serial No. 405,236, filed January 20, 1954, there is disclosed a series of aminoglycosidopurines which are useful in the treatment of trypanosomiasis. These compounds, of which 6-dimethylamino-9-(3'-amino-β-D-ribofuranosyl) purine may be cited as a specific example, are prepared by condensing a chloromercuripurine with a completely acylated haloamino sugar, and then deacylating the resultant product to obtain the desired aminoglycosidopurine. For example, 2,5 - dibenzoyl - 3 - acetamino-D-ribofuranosyl chloride-titanium chloride complex may be obtained by treatment of the corresponding glycoside with titanium tetrachloride in ethylene dichloride. The resulting compound is then condensed with the chloromercury salt of 2-methylmercapto-6-dimethylaminopurine to form the desired aminoglycosidopurine.

A wide variety of aminoglycosidopurines may be prepared in accordance with the above-described method. For example, one may prepare compounds having hydrogen, alkyl, amino, aryl, alkylamino, dialkylamino, arylamino, diarylamino, mercapto, alkylmercapto, arylmercapto and halogen substituents, interchangeably, in the 2, 6 and 8 positions of the purine moiety, as well as pentose and hexose glycosides containing amino, aralkylamino, acylamino, alkylamino and dialkylamino substituents in any one of the positions bearing a substitutable free hydroxyl group. Ribose, arabinose, lyxose, xylose, glucose, galactose and mannose are examples of sugars which may be attached to the purine moiety in accordance with the above-described process.

We have now discovered a novel series of compounds which are useful in the synthesis of aminoribofuranosylpurines. More specifically, they are of particular utility in the preparation of 6-dimethylamino-9-(3'-amino-β-D-ribofuranosyl)purine. This compound is useful in the treatment of trypanosomiasis, a disease of humans and lower animals caused by the protozoa *Trypanosoma equiperdum*. Mice inoculated intraperitoneally with a saline suspension containing 50,000 to 100,000 trypanosomes in 0.2 cc. of 50 mg. of the compound per kg. of body weight per day survive untreated mice after oral administration.

The compounds of the present invention may be represented by the following general formula:

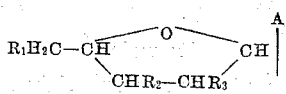

wherein A is a purinyl radical attached through its 9-position to the 1-carbon of the sugar. Such radical may be a 2-methylmercapto-6-dimethylamino-purinyl group or a 6-dimethylamino purinyl group. $R_1$ and $R_2$ in the above formula are hydroxy radicals and $R_3$ is a mesyloxy radical. When $R_1$ and $R_2$ are taken together, they comprise the dimethylmethylenedioxy radical and when $R_2$ and $R_3$ are taken together they comprise the oxido radical.

The usefulness of the above compounds as intermediates in the synthesis of therapeutically active agents can be exemplified by the conversion of 2-methylmercapto - 6 - dimethylamino - 9-(2',3'-anhydro - β - D - lyxofuranosyl)purine, the final reaction product, to 2-methylmercapto-6-dimethylamino-9 - (3' - amino - β - D - arabinofuranosyl) purine by treatment with methanol saturated with ammonia. The compound is then acylated in the 3'-position by treatment with acetic acid and acetic anhydride. The 5'-position is then blocked with a trityl group by treatment with triphenylchloromethane in the presence of pyridine followed my mesylation of the 2'-position with methanesulfonyl chloride, yielding 2-methylmercapto - 6 - dimethylamino - 9 - (2' - mesyl-3' - acetamino - 5' - trityl - β - D - arabinofuranosyl)-purine. The trityl substituent is removed by treatment with acetic acid. Upon contact of the resulting compound with sodium acetate and methoxyethanol, the 2'-mesylate group is displaced with inversion to the intermediate oxazoline ring compound which is spontaneously ruptured by the water present in the reaction mixture. Acetylation, desulfurization and O-deacylation followed by hydrolysis with barium hydroxide gives the physiologically active 6-dimethylamino-9-(3'-amino-β-D-ribofuranosyl)purine. As stated above, this aminonucleoside effectively cures *Trypanosoma equiperdum* infections in mice at an oral dose level of 50 mg. per kg. of body weight per day. The chemical transformations described briefly hereinabove are set forth in detail in our copending U. S. application S. N. 493,812, filed concurrently herewith.

In accordance with the present invention, the final product—namely, 2-methylmercapto-6-dimethylamino-9-(2',3'-anhydro-β-D-lyxofuranosyl)purine—and the intermediates leading thereto may be obtained through a series of novel chemical transformations. By known methods α-D-xylofuranose tetrabenzoate may be transformed to xylose-2,3,5-tribenzoate and thence to the corresponding 1-chloro sugar by treatment with anhydrous ether saturated with hydrogen chloride. The 1-chloro sugar is then condensed with the chloromercury derivative of 2-methylmercapto-6-dimethylaminopurine in refluxing xylene to give 2 - methylmercapto - 6 - dimethylamino - 9 - β - D-xylofuranosylpurine tribenzoate. O-debenzoylation with a catalytic amount of 1 N methanolic sodium methoxide gives 2-methylmercapto-6-dimethylamino-9-β-D-xylofuranosylpurine.

Upon condensation of the xylofuranosylpurine with acetone in the presence of copper sulfate and ethanesulfonic acid, the 3' and 5' hydroxyl groups are blocked to form the 3',5'-isopropylidene derivative. In this reaction it is preferred to employ slightly more than one mole equivalent of acid inasmuch as one full equivalent is neutralized by the basic purine moiety. The anhydrous copper sulfate serves as a dispersing agent for the salt of 2-methylmercapto-6-dimethylamino - 9 - β-D-xylofuranosylpurine formed during the course of the reaction. Since this salt is insoluble in acetone and tends to deposit as a gummy mass, the copper sulfate not only disperses the mass but also takes up the one mole of water formed during the reaction, thus also serving as a drying agent and driving the reaction to completion.

The conversion of the xylofuranosylpurine to the corresponding 3',5'-isopropylidene-xylofuranosylpurine takes place readily in the presence of acetone since only the 3' and 5' hydroxyl groups of the former compound are cis to each other and can be reacted with acetone to form the ring compound. Thus all groups on the sugar moiety are effectively blocked except the 2'-hydroxyl, which is open for further reaction.

The formation of the isopropylidene derivative may be conducted at temperatures varying from 0° C. to the boiling point of the reaction mixture, but room temperature is preferred. A period of from 5 minutes to 1 hour is required. Although the reactant, acetone, is the preferred solvent in this reaction, any anhydrous, non-basic, polar, organic solvent may be employed, as for example, a lower alkyl alcohol such as methyl alcohol, ethyl alcohol or propyl alcohol, dioxane or methoxyethanol. In lieu of copper sulfate, one may employ calcium sulfate, magnesium sulfate or any other neutral drying agent.

The 3',5'-isopropylidene-xylofuranosylpurine may be converted to the corresponding 2'-mesyl derivative by treatment with methanesulfonyl chloride in the presence of a tertiary amine base acid acceptor such as triethylamine, collidine, quinoline or pyridine, the latter being the preferred solvent. The reaction is preferably carried out at room temperature, although limits from 0° C. to 75° C. are also operable and require from 1 to 3 days for completion.

Selective removal of the isopropylidene blocking groups from the 3',5' positions leaving the glycosidic linkage intact is advantageously carried out with 70% aqueous acetic acid under preferred reaction conditions of 50° C. and 4 hours. If desired, the temperature may be varied from 20° C. to 100° C. with corresponding variations in time from ½ to 20 hours, the two variants being roughly inversely proportional to each other. A weak organic acid, such as acetic, is preferred for this reaction since strong acids tend to cleave the sugar-purine linkage. The acid also serves as a solvent. Since the starting material, i. e., the 2'-mesyl-3',5'-isopropylidene-xylofuranosylpurine is water insoluble, it is preferred that not more than a 50% dilution of acetic acid:water be employed.

When the 2'-mesyl xylofuranosylpurine is treated with at least 1 mole of methanolic sodium methoxide, the 3'-hydroxyl group attacks the adjacent 2'-mesylate group from the opposite side with Walden inversion, yielding the desired 2',3'-anhydrolyxofuranosylpurine. The reaction may be carried out with any strong base such as sodium hydroxide, potassium hydroxide, potassium tertiary butoxide or sodium ethoxide in the presence of a lower alkyl alcohol.

The following examples illustrate specific methods for preparing the new compounds in accordance with the present invention. All parts are by weight unless otherwise specified.

*Example I*

To a solution of 8.0 parts by weight 2,3,5-tribenzoyl-D-xylose (J. A. C. S., 75, 2624) in 8 parts by volume of acetyl chloride was added 54 parts by volume of a solution of dry ether saturated with hydrogen chloride at 0° C. After 5½ days at —3° C., protected from moisture, the solution was evaporated to dryness under reduced pressure (bath 50° C.). The residue was twice dissolved in 50 parts by volume portions of toluene and the evaporation repeated, leaving 2,3,5-tribenzoyl-D-xylofuranosyl chloride as a glass. This glass was dissolved in 100 parts by volume of xylene and added to a stirred mixture of 8.4 parts by weight diatomaceous earth, 7.65 parts by weight of chloromercury salt of 2-methylmercapto-6-dimethylaminopurine and 300 parts by volume of xylene previously dried by distillation of 30 parts by volume of the xylene. After being refluxed and stirred for 1 hour, the mixture was filtered through diatomaceous earth and the filter cake washed with hot toluene. The combined filtrate and washings were evaporated to dryness under reduced pressure. The residue was dissolved in 150 parts by volume of chloroform which had been used to wash the diatomaceous earth cake. The solution was washed with 150 parts by volume of 30% aqueous potassium iodide, then with water. Dried with magnesium sulfate, the chloroform solution was evaporated to dryness under reduced pressure, leaving an 88% yield of 2-methylmercapto-6-dimethylamino - 9 - (2',3',5'-tribenzoyl-β-D-xylofuranosyl)-purine as a glass. This compound is soluble in methoxyethanol, pyridine or chloroform, but insoluble in water or petroleum ether.

*Example II*

A mixture of 1.00 part by weight of 2-methylmercapto-6-dimethylamino - 9 - (2',3',5'-tribenzoyl-β-D-xylofuranosyl)purine, 15 parts by volume of reagent methanol and 0.48 part by volume of 1 N methanolic sodium methoxide was refluxed for 35 minutes, then evaporated to dryness under reduced pressure. The residue was twice evaporated under reduced pressure with 10 parts by volume portions of water to remove methyl benzoate, then dissolved in 10 parts by volume of hot chloroform. The filtered solution was evaporated to dryness under reduced pressure, leaving 2-methylmercapto-6-dimethylamino-9-β-D-xylofuranosylpurine as an amorphous glass. Crystallization from absolute alcohol-heptane gave white crystals, M. P. 184° C. to 185° C. This compound is soluble in alcohol, water or chloroform, but insoluble in benzene or heptane.

*Example III*

Reaction of 32.6 parts by weight of 2,3,5-tribenzoyl-D-xylose with acetyl chloride and ethereal hydrogen chloride as in Example I, except that the reaction was allowed to proceed for 15 days, gave 2,3,5-tribenzoyl-D-xylofuranosyl chloride. This material was dissolved in 100 parts by volume of xylene and reacted with a mixture of 24.2 parts by weight of diatomaceous earth, 31.3 parts by weight of the chloromercury salt of 2-methylmercapto-6-dimethylaminopurine and 700 parts by volume of xylene. When processed according to Example I, the mixture gave an 87% yield of 2-methylmercapto-6-dimethylamino - 9 - (2',3',5'-tribenzoyl-β-D-xylofuranosyl)purine as a glass.

A mixture of this material, 700 parts by volume of methanol and 12.6 parts by volume of 1 N methanolic sodium methoxide was refluxed for 35 minutes, then processed as in Example II to give an 80% yield of 2-methylmercapto -6- dimethylamino - 9 - D - xylofuranosylpurine as an amorphous solid which was 87% pure and suitable for further reactions.

*Example IV*

To a solution of 0.260 part by weight of 2-methylmercapto-6-dimethylamino - 9 - D - xylofuranosylpurine in 12 parts by volume of acetone was added 1.00 part by weight of anhydrous copper sulfate. A solution of 0.2 part by volume of 96% sulfuric acid in 2 parts by volume of acetone was added dropwise with shaking. After being shaken intermittently for about 2 hours, the mixture was filtered and the filter cake washed with 12 parts by volume of acetone. The combined filtrate and washings were poured on 20 parts by volume of acetone. The combined filtrate and washings were poured on 20 parts by weight of 10% aqueous sodium biscarbonate, then extracted with five 10 parts by volume portions of chloroform. The combined extracts were washed with 70 parts by volume of water, then dried with magnesium sulfate and evaporated to dryness under reduced pressure. Recrystallization of the residue from ether gave a 40% yield of white crystals of 2-methylmercapto-6-dimethylamino-9-(3',5'-isopropylidene-β-D-xylofuranosyl)purine, M. P. 138° C. to 139° C., dec.

*Example V*

To a solution of 9.6 parts by weight of 2-methylmercapto-6-dimethylamino-9-β-D-xylofuranosylpurine in 440 parts by volume of reagent acetone was added 36.8 parts by weight of anhydrous copper sulfate. A solution of 22.6 parts by volume of ethanesulfonic acid in 192 parts by volume of reagent acetone was added dropwise at a rapid rate to the vigorously stirred mixture. After being stirred an additional 20 minutes, the mixture was filtered and the filter cake washed with two 200 parts by volume portions of acetone. The combined filtrate and washings were added to 1480 parts by volume of ice cold 5% sodium carbonate with stirring. The mixture was extracted with three 175 parts by volume portions of chloroform. Dried with magnesium sulfate, the combined extracts were evaporated to dryness under reduced pressure, leaving a 90% yield of crude 2-methylmercapto-6-dimethylamino -9- (3′,5′ - isopropylidene - β - D - xylofuransoyl)-purine, suitable for the next step. Recrystallization from ethyl acetateheptane gives the pure product M. P. 138° C. to 139° C.

*Example VI*

To a solution of 0.100 part by weight of crystalline 2-methylmercapto-6-dimethylamino - 9 - (3′,5′-isopropylidene-β-D-xylofuranosyl)purine in 1 part by volume of reagent pyridine was added 0.036 part by volume of methanesulfonyl chloride. After 3 days at room temperature, protected from moisture, the reaction mixture was diluted with 7 parts by volume of water. The product, 2-methyl - mercapto - 6 - dimethylamino-9-(2′-mesyl-3′,5′-isopropylidene-β-D-xylofuranosyl)purine, was collected on a filter and washed with water, yielding 88%, M. P. 187° C. to 190° C. Recrystallization from absolute alcohol gave white crystals, M. P. 204° C. to 205° C. This compound is soluble in pyridine or chloroform, but insoluble in water or alcohol.

*Example VII*

To a solution of 9.6 parts by weight of crude 2-methylmercapto-6-dimethylamino - 9 - (3′,5′-isopropylidene-β-D-xylofuranosyl)purine (prepared as in Example V) in 96 parts by volume of reagent pyridine cooled to 5° C. was added 2.93 parts by volume of methanesulfonyl chloride. After 3 days at room temperature, the mixture was poured into 600 parts by volume of water with stirring. The crystals of 2-methylmercapto - 6 - dimethylamino-9-(2′-mesyl-3′,5′-isopropylidene-β-D-xylofuranosyl)purine were collected and washed with water, yielding 80%, M. P. 196° C. to 199° C.

*Example VIII*

A mixture of 9.25 parts by weight of 2-methylmercapto-6-dimethylamino-9-(2′ - mesyl-3′,5′-isopropylidene-β-D-xylofuransoyl)purine and 93 parts by volume of 70% acetic acid was stirred at 50° C. to 52° C. for 4½ hours, solution being complete in 2½ hours. The solution was evaporated to dryness under reduced pressure (bath 50° C.). The residue was dissolved in toluene by addition of sufficient absolute alcohol to give solution, then evaporated to dryness under reduced pressure. The evaporation with toluene-absolute alcohol was repeated twice more. Trituration of the crystalline residue with 30 parts by volume of hot toluene gave an 89% yield of crystals 2-methyl-mercapto-6-dimethylamino-9-(2′ - mesyl-β-D-xylofuranosyl)purine, M. P. 171° C. to 172° C. Recrystallization from ethyl acetate-heptane afforded white crystals, M. P. 174° C. to 175° C. This compound is soluble in alcohol, pyridine or chloroform, but insoluble in toluene or heptane.

*Example IX*

To a hot solution of 6.95 parts by weight of 2-methylmercapto-6-dimethylamino-9-(2′-mesyl-β - D - xylofuranosyl)purine in 60 parts by weight of dry methanol was added a solution of 1.35 parts by weight of sodium methoxide in 13 parts by volume of dry methanol. The solution was refluxed and stirred for 10 minutes, crystalline solids separating soon after the boiling point was reached. The mixture was cooled to 0° C., filtered and the product washed with 10 parts by volume of methanol, then several times with water, yielding 86% 2-methylmercapto-6-dimethylamino - 9 - (2′,3′ - anhydro-β-D-lyxofuranosyl)purine, M. P., 211° C. to 212° C. This compound is insoluble in water or methanol, but soluble in chloroform or pyridine.

We claim:

1. A compound selected from the group consisting of those having the general formula:

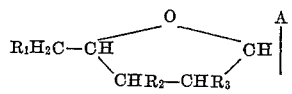

wherein A is a purinyl radical, $R_1$ and $R_2$ are hydroxy radicals, $R_3$ is a mesyloxy radical, when $R_1$ and $R_2$ are taken together they comprise the dimethylmethylenedioxy group and when $R_2$ and $R_3$ are taken together they comprise the oxido group.

2. The compound 2-methylmercapto-6-dimethylamino-9-(3′,5′-isopropylidene-β-D-xylofuranosyl)prine.

3. The compound 2-methylmercapto-6-dimethylamino-9-(2′-mesyl-3′,5′-isopropylidene-β-D-xylofuranosyl)purine.

4. The compound 2-methylmercapto-6-dimethylamino-9-(2′-mesyl-β-D-xylofuranosyl)purine.

5. The compound 2-methylmercapto-6-dimethylamino-9-(2′,3′-anhydro-β-D-xylofuranosyl)purine.

6. A method for preparing compounds selected from the group consisting of those having the general formula:

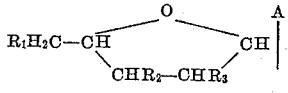

wherein A is a purinyl radical, $R_1$ and $R_2$ are hydroxy radicals, $R_3$ is a mesyloxy radical, $R_1$ and $R_2$ when taken together comprise the dimethylmethylenedioxy group, and $R_2$ and $R_3$ when taken together comprise the oxido group, which comprises condensing a 2,3,5-triacyl-D-xylofuranosyl chloride with the chloromercury salt of a purine to obtain the corresponding triacyl glycosidopurine, O-deacylating said compound by treatment with methanolic sodium methoxide to obtain a xylofuranosyl purine, treating said product with acetone in the presence of copper sulfate and ethanesulfonic acid to obtain the corresponding 3′,5′-isopropylidene derivative, mesylating said product to obtain the corresponding 2′-mesyl derivative, treating said product with dilute acetic acid to obtain a 2′-mesyl xylofuranosyl purine and treating said compound with methanolic sodium methoxide to obtain the 2′,3′-anhydro derivative.

References Cited in the file of this patent

UNITED STATES PATENTS 2,719,843    Davoll et al. _____ Oct. 4, 1955

OTHER REFERENCES

Baker et al.: "Journal Organic Chemistry," November 1954, vol. 19, No. 11, pp. 1780 to 1782 relied on.

Honeyman: "Chemistry of Carbohydrates," pub. by Oxford, Clarendon Press (London), 1948 (pp. 61, 69 relied on).

Pigman et al.: "Carbohydrate Chemistry," pub. by Academic Press (N. Y.), 1948 (pp. 175–229 and 353 relied on).

Pigman et al.: "Advances in Carbohydrate Chemistry," pub. by Academic Press (N. Y.), 1945 (page 207 relied on).